(12) United States Patent
Lim

(10) Patent No.: US 11,470,345 B2
(45) Date of Patent: Oct. 11, 2022

(54) METHOD AND APPARATUS FOR ENCODING/DECODING A VIDEO SIGNAL, AND A RECORDING MEDIUM STORING A BITSTREAM

(71) Applicant: KT CORPORATION, Gyeonggi-do (KR)

(72) Inventor: Sung Won Lim, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 17/343,063

(22) Filed: Jun. 9, 2021

(65) Prior Publication Data

US 2021/0392370 A1 Dec. 16, 2021

(30) Foreign Application Priority Data

Jun. 10, 2020 (KR) .................. 10-2020-0070336
Jun. 8, 2021 (KR) .................. 10-2021-0074103

(51) Int. Cl.
*H04N 19/563* (2014.01)
*H04N 19/577* (2014.01)

(52) U.S. Cl.
CPC ......... *H04N 19/563* (2014.11); *H04N 19/577* (2014.11)

(58) Field of Classification Search
CPC .......................... H04N 19/563; H04N 19/577
USPC ..................................................... 375/240.16
See application file for complete search history.

(56) References Cited

U.S. PATENT DOCUMENTS

2020/0389663 A1* 12/2020 Li ........................ H04N 19/184

* cited by examiner

*Primary Examiner* — Allen C Wong
(74) *Attorney, Agent, or Firm* — IP Legal Services, LLC

(57) ABSTRACT

A video decoding method according to the present disclosure may include determining whether an affine motion model is applied to a current block or not, performing motion compensation for the current block according to whether the affine motion model is applied or not, determining a value of a first variable and a second variable representing whether a prediction block obtained by the motion compensation will be refined and determining a padding size of the prediction block.

15 Claims, 9 Drawing Sheets

METHOD AND APPARATUS FOR ENCODING/DECODING A VIDEO SIGNAL, AND A RECORDING MEDIUM STORING A BITSTREAM

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter prediction technique of predicting a pixel value included in a current picture from a previous or subsequent picture of the current picture; an intra prediction technique of predicting a pixel value included in a current picture by using pixel information in the current picture; an entropy encoding technique of assigning a short code to a value with a high appearance frequency and assigning a long code to a value with a low appearance frequency; and the like. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

The present disclosure is to provide a method and a device of refining a prediction block obtained by motion compensation.

The present disclosure is to provide a method and a device of reducing complexity in determining whether block padding is performed when block padding is performed for refining a prediction block.

Technical effects of the present disclosure may be non-limited by the above-mentioned effects, and other unmentioned technical effects may be clearly understood from the following description by those having ordinary skill in the technical field to which the present disclosure pertains.

Technical Solution

An image decoding method according to the present disclosure includes determining whether an affine motion model is applied to a current block or not, performing motion compensation for the current block according to whether the affine motion model is applied or not, determining values of a first variable and a second variable representing whether a prediction block obtained by the motion compensation will be refined and determining a padding size of the prediction block. In this case, the first variable may represent whether BDOF (Bi-Directional Optical Flow) will be applied to the prediction block, the second variable may represent whether PROF (Prediction-Refinement Optical Flow) will be applied to the prediction block or not, and the padding size may be determined based on values of the first variable and the second variable.

An image encoding method according to the present disclosure includes determining whether an affine motion model is applied to a current block or not, performing motion compensation for the current block according to whether the affine motion model is applied or not, determining values of a first variable and a second variable representing whether a prediction block obtained by the motion compensation will be refined and determining a padding size of the prediction block. In this case, the first variable may represent whether BDOF (Bi-Directional Optical Flow) will be applied to the prediction block, the second variable may represent whether PROF (Prediction-Refinement Optical Flow) will be applied to the prediction block or not, and the padding size may be determined based on values of the first variable and the second variable.

In an image decoding method according to the present disclosure, the padding size may be determined without referring to a syntax signaled through a picture header.

In an image decoding method according to the present disclosure, the padding size may be determined without referring to a syntax representing whether an affine motion model is applied.

In an image decoding method according to the present disclosure, the first variable may be determined based on whether bidirectional prediction is performed for the current block, POC (Picture Order Count) of an L0 reference picture and an L1 reference picture of the current block, whether a CIIP mode is applied to the current block, an L0 weight and an L1 weight of the current block and a size of the current block.

In an image decoding method according to the present disclosure, the second variable may be determined based on at least one of whether integrated sub-block motion compensation method is applied to the current block or not, whether control point motion vectors of the current block are the same each other, or whether size conversion is performed for a reference picture.

In an image decoding method according to the present disclosure, when both the first variable and the second variable are 0, the padding size may be set to be 0 and when the first variable or the second variable is 1, the padding size may be set to be 2.

In an image decoding method according to the present disclosure, when the padding size is set to be 2, padding which respectively expands a width and a height of the current block by 2 may be performed.

In an image decoding method according to the present disclosure, refine for the prediction block may be performed based on a prediction sample and an offset corresponding to the prediction sample, the offset may be derived based on a horizontal directional gradient or a vertical directional gradient for the prediction sample and when the prediction sample adjoins a boundary in a sub-block, the horizontal directional gradient or the vertical directional gradient of the prediction sample may be obtained based on a padded sample.

The characteristics which are simply summarized above for the present disclosure are just an illustrative aspect of a detailed description of the after-described present disclosure and do not limit a range of the present disclosure.

Technical Effects

According to the present disclosure, prediction accuracy may be improved by refining a prediction block obtained by motion compensation.

According to the present disclosure, when block padding is performed for refining a prediction block, complexity may be reduced in determining whether block padding is performed.

Effects obtainable from the present disclosure may be non-limited by the above-mentioned effect, and other unmentioned effects may be clearly understood from the following description by those having ordinary skill in the technical field to which the present disclosure pertains.

DESCRIPTION OF DIAGRAMS

MODE FOR INVENTION

Figure 1:
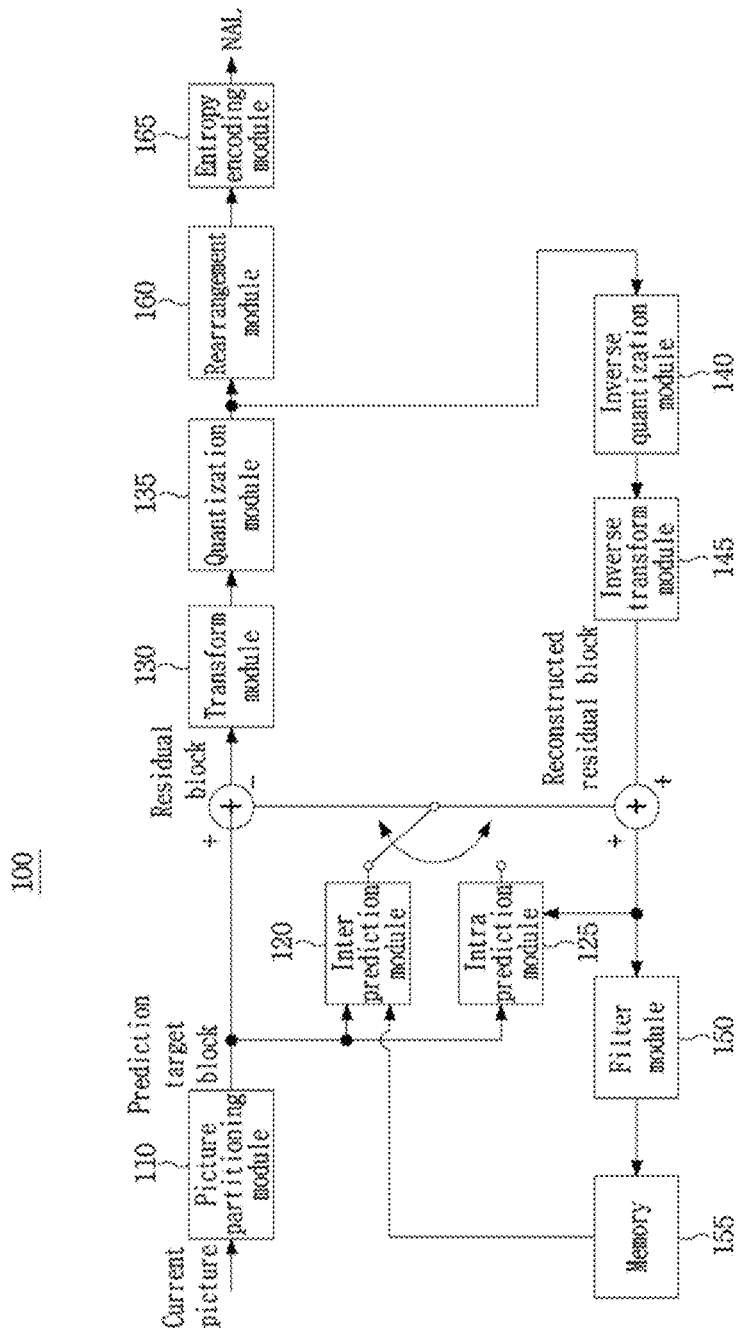
FIG. 1 is a block diagram illustrating a device for encoding a video according to an embodiment of the present disclosure.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present disclosure.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video, and does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be partitioned into a plurality of constitutional parts to perform each function. The embodiment where each constitutional part is combined and the embodiment where one constitutional part is partitioned are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of a plurality of coding units, prediction units, and transform units, and may encode a picture by selecting one combination of coding units, prediction units, and transform units with a predetermined criterion (e.g., cost function).

For example, one picture may be partitioned into a plurality of coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so that one prediction unit of prediction units partitioned in a single coding unit have a different shape and/or size from other prediction unit.

In the intra prediction, the transform unit and the prediction unit may be set to be the same. In this case, after dividing the coding unit into a plurality of transform units, intra prediction may be performed for each transform unit. The coding unit may be divided in a horizontal direction or a vertical direction. The number of transform units generated by dividing the coding unit may be 2 or 4 depending on the size of the coding unit.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit performing prediction may be different from the processing unit for which the prediction method and detailed content is determined. For example, the prediction method, the prediction mode, etc. may be determined on the basis of the prediction unit, and prediction may be performed on the basis of the transform unit. A residual value (residual block) between the generated prediction block and an original block may be input to the transform module 130. Also, prediction mode information, motion vector information, etc. used for prediction may be encoded with the residual value in the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel on the basis of a ¼ pixel. In the case of chroma signals, a 4-tap DCT-based interpolation filter having different filter coefficient may be used to generate pixel information of an integer pixel or less than an integer pixel on the basis of a pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value on the basis of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction unit 125 may generate a prediction block based on reference pixel information, which is pixel information in the current picture. Reference pixel information may be derived from a selected one of a plurality of reference pixel lines. The N-th reference pixel line among the plurality of reference pixel lines may include left pixels having an x-axis difference of N from a top-left pixel in the current block and top pixels having a y-axis difference of N from the top-left pixel of the current block. The number of reference pixel lines that the current block can select may be 1, 2, 3, or 4.

If the neighboring block of the current prediction unit is a block that has performed inter prediction and the reference pixel is a pixel resulting from performing inter prediction, the reference pixel included in the block that has performed inter prediction may be replaced with reference pixel information of the neighboring block that has performed intra prediction. That is, when the reference pixel is not available, the reference pixel information that is not available may be replaced with at least one information of the available reference pixels.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when a size of the prediction unit is the same as a size of the transform unit, intra prediction may be performed on the prediction unit based on pixels positioned at the left, the top left, and the top of the prediction unit.

In the intra prediction method, a prediction block may be generated after applying a smoothing filter to a reference pixel according to a prediction mode. Whether to apply the smoothing filter may be determined according to the selected reference pixel line.

In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on a size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, or an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture on the basis of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be partitioned into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
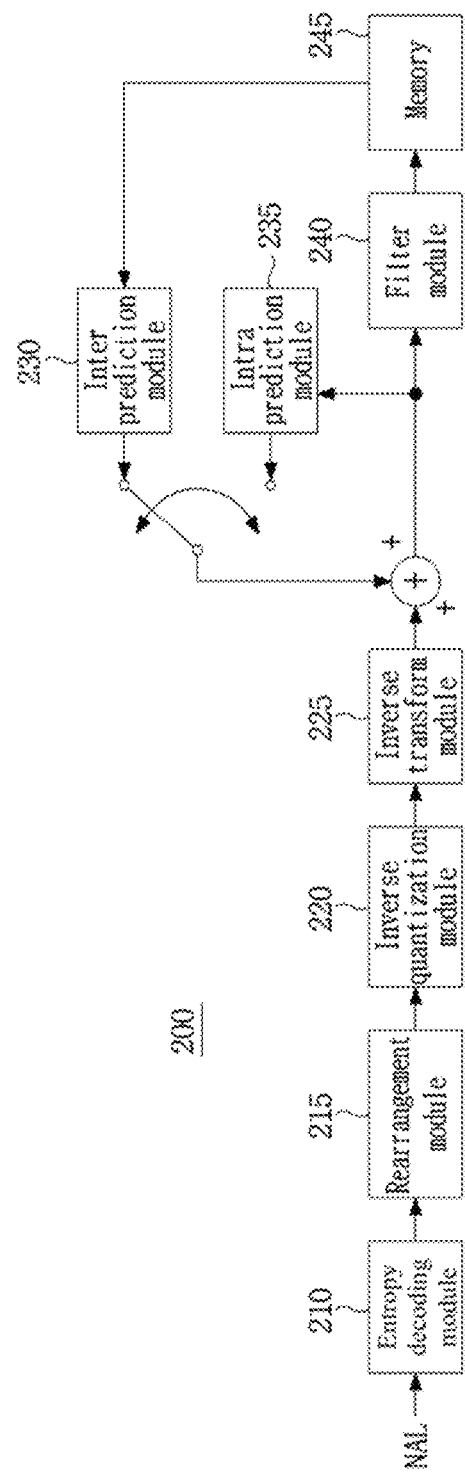
FIG. 2 is a block diagram illustrating a device for decoding a video according to an embodiment of the present disclosure.

FIG. 2 is a block diagram illustrating a device for decoding a video according to an embodiment of the present disclosure.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on a plurality of pieces of information, such as the prediction method, a size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when a size of the prediction unit is the same as a size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may partition a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on a type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

In addition, the current block represents a block to be encoded/decoded, and may represent a coding tree block (or coding tree unit), a coding block (or coding unit), a transform block (or transform unit), and a prediction block (or a prediction unit) or a block to which the in-loop filter is applied, etc. according to an encoding/decoding step. In this specification, 'unit' denotes a basic unit for performing a specific encoding/decoding process, and 'block' may denote a pixel array having a predetermined size. Unless otherwise specified, 'block' and 'unit' may be used interchangeably. For example, in an embodiment to be described later, it may be understood that the coding block (coding block) and the coding unit (coding unit) have the same meaning as each other.

Figure 3:
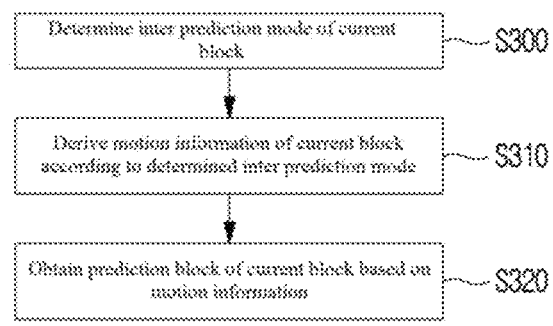
FIG. 3 illustrates an inter prediction method in an image decoding apparatus according to the present disclosure.

FIG. 3 illustrates an inter prediction method in an image decoding apparatus according to the present disclosure.

Referring to FIG. 3, an inter prediction mode of a current block may be determined (S300).

At least one of a plurality of inter prediction modes pre-defined in the image decoding apparatus may be determined as the inter prediction mode of the current block. Herein, the plurality of inter prediction modes may include a skip mode, a merge mode, an advanced motion vector prediction (AMVP) mode, and the like. In addition, a combined inter and intra prediction (CIIP) mode, a decoder side motion vector refinement (DMVR) mode, and the like may be used as additional modes.

Prediction mode information indicating the inter prediction mode of the current block may be signaled from the image encoding apparatus to the image decoding apparatus. The prediction mode information may be included in a bitstream and received by the image decoding apparatus. The prediction mode information may be expressed as a plurality of flag information, and the inter prediction mode of the current block may be determined through hierarchical signaling of a plurality of flag information. Alternatively, the prediction mode information may include index information indicating one of a plurality of candidate modes.

For example, the skip flag may be signaled to indicate whether to apply the skip mode, and when the skip mode is not applied, the merge flag may be signaled to indicate whether to apply the merge mode. When the merge mode is not applied, the AMVP mode may be applied.

On the other hand, when the merge mode is not applied to the current block, information (inter_pred_idc) indicating whether list0 (L0) prediction, list1 (L1) prediction, or bi-prediction is used for the current block is signaled to the current block. The information may be referred to as motion prediction direction information, inter prediction direction information, or inter prediction indication information. In this specification, for convenience of description, the inter prediction type (L0 prediction, L1 prediction, or BI prediction) indicated by inter_pred_idc of a syntax element may be indicated as a motion prediction direction. L0 prediction, L1 prediction, bi-prediction may be expressed as pred_L0, pred_L1, and pred_BI, respectively.

One picture may include one or more slices. The slice may have any one type of intra (I) slice, predictive (P) slice, or bi-predictive (B) slice. The slice type may be indicated based on slice type information. For a block in I slice, inter prediction is not used and only intra prediction may be used. Of course, even in this case, the original sample value may be coded and signaled without prediction. For a block in a P slice, intra prediction and/or inter prediction may be used, and when inter prediction is used, only uni-prediction may be used. Meanwhile, for a block in a B slice, intra prediction and/or inter prediction may be used, and when inter prediction is used, not only uni-prediction but also bi-prediction may be used.

L0 and L1 may include reference pictures encoded/decoded before the current picture. For example, L0 may include reference pictures before and/or after the current picture in POC order, and L1 may include reference pictures after and/or before the current picture in POC order. In this case, in L0, less reference picture indexes may be allocated to reference pictures before the current picture in POC order, and in L1, less reference picture indexes may be allocated to reference pictures after the current picture in POC order. In the case of B slice, bi-prediction may be applied, and even in this case, bi-prediction in one direction may be applied, or bi-prediction in both directions may be applied.

Information on the inter prediction mode of the current block may be signaled by being coded at a level such as CU (CU syntax), or may be implicitly determined according to a predetermined condition. Some modes are explicitly signaled, and other modes may be implicitly derived.

For example, the CU syntax may define information on the (inter) prediction mode as follows.

cu_skip_flag may indicate whether the skip mode is applied to the current block (CU).

pred_mode_ibc_flag may indicate whether the current block is a block coded in the IBC prediction mode. For example, when the value of pred_mode_ibc_flag is 1, it specifies that the current block is coded in the IBC prediction mode, and when the value of pred_mode_ibc_flag is 0, it may specify that the current block is not coded in the IBC prediction mode. Herein, the IBC prediction mode refers to a mode of predicting by referring to a region which belongs to the same picture as the current block and is pre-restored before the current block. The pre-restored region is specified based on a predetermined motion vector.

general_merge_flag may indicate availability of the general merge mode. When the value of general_merge_flag is 1, a regular merge mode, a mmvd mode, and a merge subblock mode (subblock merge mode) may be used. For example, when the value of general_merge_flag is 1, the merge data syntax may be parsed from the bitstream, and the merge data syntax may be configured/coded to include the following information.

merge_subblock_flag may indicate whether a subblock-based merge mode is applied to the current block. When the sub-block based merge mode is applied, motion compensation may be performed by based on at least one of STMVP (Spatial Temporal Motion Vector Predictor) or affine motion model. merge_subblock_idx may specify a merge candidate index of a subblock-based merge candidate list (hereinafter, referred to as sub-block merge candidate list). According to a value of the merge_subblock_idx, one among STMVP or affine motion model may be selected.

regular_merge_flag may indicate whether the merge mode (i.e., regular merge mode) is applied to the current block. For example, when the value of regular_merge_flag is 1, a regular merge mode or a merge mode with motion vector difference (MMVD) may be used to derive motion information of the current block.

mmvd_merge_flag may indicate whether MMVD is applied to the current block. Herein, MMVD may mean a mode in which a motion vector is modified by adding a predetermined MVD to a motion vector pre-derived according to the merge mode. For example, when the value of mmvd_merge_flag is 1, MMVD may be used to derive motion information of the current block. The mmvd_cand_flag may indicate whether the first candidate of the merge candidate list is used as a motion vector of the merge mode or the second candidate is used as a motion vector of the merge mode.

ciip_flag may indicate whether the CIIP mode is applied to the current block. The CIIP mode means a method in which an inter prediction block and an intra prediction block are generated through inter prediction and intra prediction for the current block, respectively, and a final prediction block of the current block is generated through a weighted sum of the inter prediction block and the intra prediction block. Herein, the inter prediction block may be performed based on any one of the aforementioned inter prediction modes. Alternatively, the inter prediction block may be generated using only a merge mode (in particular, a regular merge mode) of the aforementioned inter prediction modes. The intra prediction block may be generated using only a non-directional mode (e.g., planar mode) among pre-defined intra prediction modes.

Referring to FIG. 3, motion information of a current block according to the determined inter prediction mode may be derived (S310).

The motion information may include at least one of a motion vector (mv), a reference picture index (refIdx), or a prediction direction flag (predFlagL0, predFlagL1). The motion vector specifies the position of the reference block, and the reference picture index may specify the reference picture of the current block from among one or more reference pictures included in the reference picture list. Also, predFlagL0 may indicate whether to perform L0 prediction, and predFlagL1 may indicate whether to perform L1 prediction.

When the merge mode is applied, motion information of the current block is not directly transmitted, and motion information of the current block may be derived using motion information of a neighboring block. Motion information of the current block may be indicated by transmitting a flag indicating that the merge mode has been used and a merge index specifying a merge candidate of the current block in the merge candidate list. The merge mode may be called a regular merge mode. For example, the merge mode may be applied when the value of regular_merge_flag is 1.

Hereinafter, a method of deriving motion information according to the merge mode will be described in detail.

The merge candidate list may be constructed using five merge candidate blocks. For example, four spatial merge candidates and one temporal merge candidate may be used.

The image decoding apparatus inserts spatial merge candidates derived by searching spatial neighboring blocks of the current block into the merge candidate list. For example, the spatial neighboring blocks may include at least one of a bottom-left neighboring block (A0), a left neighboring block (A1), a top-right neighboring block (B0), a top neighboring block (B1), or a top-left neighboring block (B2) of the current block. However, this is only an example, and in addition to the spatial neighboring blocks described above, a right neighboring block, a bottom neighboring block, a bottom-right neighboring block, etc. may be further used, or may be used instead of the spatial neighboring blocks described above.

The image decoding apparatus may detect available blocks by searching for the spatial neighboring blocks based on priority, and derive motion information of the detected blocks as spatial merge candidates. For example, the image decoding apparatus may construct a merge candidate list by searching for five blocks in the order of A1, B1, B0, A0, and B2 and sequentially indexing available candidates. However, the present disclosure is not limited thereto, and the five blocks may be searched in the order of B1, A1, B0, A0, and B2. The B2 block may be searched only when at least one of the remaining blocks A1, B1, B0, and A0 is unavailable. Herein, the "unavailable" may mean a case in which the block belongs to a slice or tile different from a current block, a case in which the block is coded in an intra mode, and the like.

In addition, in order to insert a spatial merge candidate, a redundancy check between spatial neighboring blocks may be performed. This is to exclude a spatial neighboring block having the same motion information as a spatial neighboring block already determined as a spatial merge candidate from the merge candidate list. However, the redundancy check may be performed only between pre-defined block pair in order to reduce computational complexity. Here, the block pair may be defined as (A1, B1), (B0, B1), (A0, A1), (B1, B2), (A1, B2). That is, if the spatial neighboring block at the A0 position is available, it may be checked whether the spatial neighboring blocks at the A1 and B0 positions have the same motion information as the spatial neighboring block at the location B1. If the spatial neighboring block at the A1 position is available, it may be checked whether the spatial neighboring block at the A0 position has the same motion information as the spatial neighboring block at the A1 position. As a result of the redundancy check, if it has the same motion information, the corresponding spatial neighboring block may not be inserted into the merge candidate list. However, the block pair is only an example, and may be defined as (A0, A1), (A0, B0), (B0, B1), (B0, B2), (A0, B2).

The image decoding apparatus may insert a temporal merge candidate derived by searching for a temporal neighboring block of the current block into the merge candidate list. The temporal neighboring block may belong to a reference picture which is a picture different from the current picture including the current block. The reference picture including the temporal neighboring block may be referred to as a collocated picture or a col picture. The temporal neighboring block may be a bottom-right neighboring block (C0) of a co-located block with respect to the current block in the col picture or a center block (C1) including a center position of the co-located block. The search for the temporal neighboring block may be performed in the order of C0 and C1.

The image decoding apparatus may check whether the number of current merge candidate(s) inserted into the merge candidate list through the above-described process is less than the number of maximum merge candidates. The number of the maximum merge candidates may be pre-defined or may be signaled from an image encoding apparatus to an image decoding apparatus. For example, the image encoding apparatus may generate information on the number of the maximum merge candidates, encode the information, and transmit it to the image decoding apparatus in the form of a bitstream. When the number of current merge candidates is the same as the number of maximum merge candidates, an additional merge candidate insertion process may not proceed.

As a result of the checking, when the number of the current merge candidates is less than the number of the maximum merge candidates, the video decoding apparatus inserts an additional merge candidate into the merge candidate list. The additional merge candidate may include at least one of a history-based merge candidate(s), a pair-wise average merge candidate(s), or a zero vector merge candidate to be described later.

History-based merge candidate may be added to the merge candidate list, and may be added after the spatial merge candidate and the temporal merge candidate. That is, motion information of a block coded before the current block may be stored in a buffer having a predetermined size and may be used as a merge candidate of the current block. Hereinafter, a pre-coded block or motion information of the pre-coded block stored in the buffer will be referred to as an HVMP candidate.

The buffer includes a plurality of HMVP candidates, but the number of HMVP candidates in units of CTU rows may be reset (initialized) to zero. When the pre-coded block is coded in the inter mode and is not a subblock-based merge mode, the pre-coded block may be added to the buffer as an HMVP candidate. In this case, the pre-coded block may be added to the last entry of the buffer or may be added to the first entry. The size of the buffer is 5, which may mean that up to 5 HMVP candidates can be added to the buffer. When a new HMVP candidate is added, the previously stored HMVP candidate may be removed from the buffer (i.e., first-in-first-out method). However, when an HMVP candidate having the same motion information as the newly added HMVP candidate exists in the buffer, the HVMP candidate having the same motion information may be removed from the buffer. After the removal, all or some of the remaining HMVP candidates are moved forward in the buffer. For example, when the i-th HMVP candidate is removed, the (i+1)-th HMVP candidate is moved to the position of the i-th HMVP candidate, and the (i+2)-th HMVP candidate is moved to the position of the (i+1)-th HMVP candidate. Then, the newly added HMVP candidate may be added to the last entry of the buffer.

A redundancy check may be performed between HMVP candidate(s) recently added among HMVP candidates belonging to the buffer and spatial/temporal merge candidates. However, in order to reduce the number of operations for the redundancy check, the number (H) of HMVP candidates used to generate the merge candidate list may be variably determined based on the number (N) of merge candidates present in the merge candidate list. For example, when the number (N) of merge candidates present in the merge candidate list is less than or equal to 4, H may be set as the number of available HMVP candidates in the buffer. On the other hand, when the number (N) of merge candidates present in the merge candidate list is greater than 4, H may be set to (8-N). However, the addition of the history-based merge candidate may be performed only until the number of current merge candidates in the merge candidate list reaches the value resulting from subtracting one from the number of the maximum merge candidates.

In addition, in this specification, Pair-wise average merge candidate may be referred to as an average merge candidate. The pair-wise average merge candidate may be generated through an average operation of a pre-defined merge candidate pair among merge candidates in the merge candidate list. The merge candidate pair may be defined as {(0, 1), (0, 2), (1, 2), (0, 3), (1, 3), (2, 3)}, where a number may mean a merge index of the merge candidate list. Even after the average merge candidate is added to the merge candidate list, if the number of current merge candidates in the merge candidate list does not reach the number of the maximum merge candidates, the zero vector merge candidate may be added as the last entry of the merge candidate list. The addition of the zero vector merge candidate may be performed until the number of current merge candidates in the merge candidate list reaches the number of the maximum merge candidates.

On the other hand, as a result of the checking, when the number of the current merge candidates is not less than the number of the maximum merge candidates, the image decoding apparatus may terminate the construction of the merge candidate list. In this case, the image encoding apparatus may select an optimal merge candidate among merge candidates constructing the merge candidate list based on a rate-distortion (RD) cost, and selection information (e.g. merge index) indicating the selected merge candidate may be signaled to the image decoding apparatus. The image decoding apparatus may select the optimal merge candidate based on the merge candidate list and the selection information.

Motion information of the selected merge candidate may be used as motion information of the current block.

Referring to FIG. 3, a prediction block of a current block may be obtained based on the derived motion information (S320).

The prediction block may include prediction samples of the current block. When the motion vector of the current block indicates a fractional sample unit, an interpolation procedure may be performed, and through this, a prediction sample of the current block may be derived based on the reference samples of the fractional sample unit in the reference picture.

The obtained prediction block may include at least one of a block obtained through L0 prediction (hereinafter, referred to as an L0 prediction block) or a block obtained through L1 prediction (hereinafter, referred to as an L1 prediction block). L0 prediction may refer to a prediction using a reference picture in reference picture list 0 (List0) and a motion vector in the L0 direction (mvL0), and L1 prediction may refer to a prediction using a reference picture in the reference picture list 1 (List1) and a motion vector in the L1 direction (mvL1).

For example, when the current block performs uni-prediction, only one of an L0 prediction block or an L1 prediction block may be obtained for the current block. In particular, when the current block performs only L0 prediction (i.e., predFlagL0=1 and predFlagL1=0), only the L0 prediction block may be obtained for the current block. On the other hand, when the current block performs L1 prediction (i.e., predFlagL0=0 and predFlagL1=1), only the L1 prediction block may be obtained for the current block. The obtained L0 or L1 prediction block may be used as a prediction block of the current block, or a prediction block of the current block may be obtained by applying weighted prediction to the obtained L0 or L1 prediction block.

Meanwhile, when the current block performs bi-prediction, an L0 prediction block and an L1 prediction block are obtained for the current block, respectively, and a prediction block of the current block may be obtained through weighted prediction of the L0 prediction block and the L1 prediction block.

Except for a translation motion compensation model for compensating a linear movement of an object, an affine motion model may be used to compensate a nonlinear motion of an object. In this case, a nonlinear motion represents enlargement, reduction or rotation, etc.

When an affine motion model is applied, one of a 4-parameter affine model and a 6-parameter affine model may be selected.

Figure 4A:
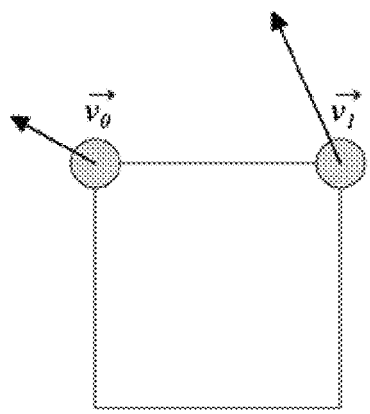
FIGS. 4A and 4B represents a 4-parameter affine model and a 6-parameter affine model.
Figure 4B:
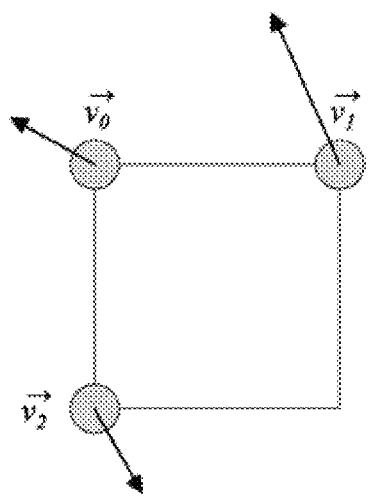

FIGS. 4A and 4B represents a 4-parameter affine model and a 6-parameter affine model.

For compensating a nonlinear motion model of an object, control point motion vectors (CPMV) may be derived.

When an affine merge mode is applied, control point motion vectors of a current block may be derived based on a sub-block merge candidate list. In an example, an affine merge mode may be applied only when a sub-block based merge mode is applied (i.e., when merge_subblock_flag is 1).

A sub-block merge candidate may be derived by referring to a neighboring block adjacent to a current block. In this case, a neighboring block may include at least one of a left neighboring block, a top neighboring block, a top-right neighboring block, a bottom-left neighboring block or a top-left neighboring block.

In an example, when a neighboring block is encoded/decoded based on an affine motion model, control point motion vectors of a neighboring block may be set as a sub-block merge candidate.

When the number of sub-block merge candidates included in a sub-block merge candidate list is smaller than a threshold value, a sub-block merge candidate may be derived by combining translation motion vectors of neighboring blocks.

Subsequently, control point motion vectors of a current block may be derived based on a sub-block merge candidate selected by merge_subblock_idx.

When a merge mode is not applied to a current block, whether an affine motion model is applied or not may be determined based on inter_affine_flag. When a value of a flag, inter_affine_flag, is 1, it represents that an AMVP based affine motion model is applied.

When an AMVP based affine motion model is applied, a difference between a control point motion vector and a control point motion vector prediction value may be additionally encoded/decoded. In this case, a control point motion vector prediction value may be derived from a neighboring block adjacent to a current block. Concretely, a control point motion vector prediction value may be derived by selecting one of control point motion vector candidates included in a control point motion vector candidate list after generating a control point motion vector candidate list based on neighboring blocks adjacent to a current block.

A control point motion vector candidate may be derived based on at least one of neighboring blocks adjacent to a current block.

In an example, when neighboring blocks at a top position of a current block are searched in a predefined order, a control point motion vector candidate may be derived from an available neighboring block which is firstly found. In this case, neighboring blocks at a top position of a current block may include at least one of a top neighboring block, a top-right neighboring block and a top-left neighboring block. And, a predefined search order may be defined in an order of a top neighboring block, a top-right neighboring block and a top-left neighboring block. In addition, availability of a neighboring block may be determined based on whether a neighboring block is encoded/decoded by an affine model.

In addition, when neighboring blocks at a left position of a current block are searched in a predefined order, a control point motion vector candidate may be derived from an available neighboring block which is firstly found. In this case, neighboring blocks at a left position of a current block may include at least one of a left neighboring block and a bottom-left neighboring block. And, a predefined search order may be defined in an order of a left neighboring block and a bottom-left neighboring block.

Despite the process, when two control point motion vector candidates are not added to a control point motion vector candidate list, a control point motion vector candidate may be generated by combining translation motion vectors of neighboring blocks.

After adding two control point motion vector candidates to a control point motion vector candidate list, one of two control point motion vector candidates may be selected. The selection may be based on a 1-bit flag. A control point motion vector prediction value of a current block may be derived based on a selected control point motion vector candidate.

A motion vector per sample in a current block may be derived by using control point motion vectors. In an example, the following Equation 1 and Equation 2 represent an example of deriving a motion vector, ($mv_x$, $mv_y$), for a sample at a (x, y) position. Equation 1 represents an example of deriving a motion vector under a 4-parameter affine model and Equation 2 represents an example of deriving a motion vector under a 6-parameter affine model. In Equation 1 and Equation 2, ($mv_{nx}$, $mv_{ny}$) represents a control point motion vector, $v_n$.

$$\begin{cases} mv_x = \dfrac{mv_{1x} - mv_{0x}}{W}x + \dfrac{mv_{xy} - mv_{0y}}{W}y + mv_{0x} \\ mv_y = \dfrac{mv_{xy} - mv_{0x}}{W}x + \dfrac{mv_{xy} - mv_{0y}}{W}y + mv_{0y} \end{cases} \quad \text{[Equation 1]}$$

$$\begin{cases} mv_x = \dfrac{mv_{1x} - mv_{0x}}{W}x + \dfrac{mv_{xy} - mv_{0y}}{H}y + mv_{0x} \\ mv_y = \dfrac{mv_{xy} - mv_{0x}}{W}x + \dfrac{mv_{xy} - mv_{0y}}{H}y + mv_{0y} \end{cases} \quad \text{[Equation 2]}$$

Instead of deriving a motion vector per sample, a motion vector per sub-block may be derived. A size/a shape of a sub-block may be predefined in an encoder and a decoder. In an example, a motion vector may be derived per 4×4 sized sub-block. Alternatively, a size/a shape of a sub-block may be adaptively determined based on a size/a shape of a current block.

A motion vector of a sub-block may be set as a motion vector of a sample at a representative position in a sub-block. In this case, a sample at a representative position may be a sample at a central position in a sub-block, a sample at a top-left position, a sample at a bottom-left position, a sample at a top-right position or a sample at a bottom-right position.

A representative position may be predefined in an encoder and a decoder. Alternatively, a representative position may be adaptively determined according to a position of a sub-block. In an example, when a sub-block adjoins a top boundary of a current block, a sample at a representative position may be determined as a sample adjacent to a top boundary of a sub-block. On the other hand, when a subblock adjoins a bottom boundary of a current block, a sample at a representative position may be determined as a sample adjacent to a bottom boundary of a sub-block.

Figure 5:
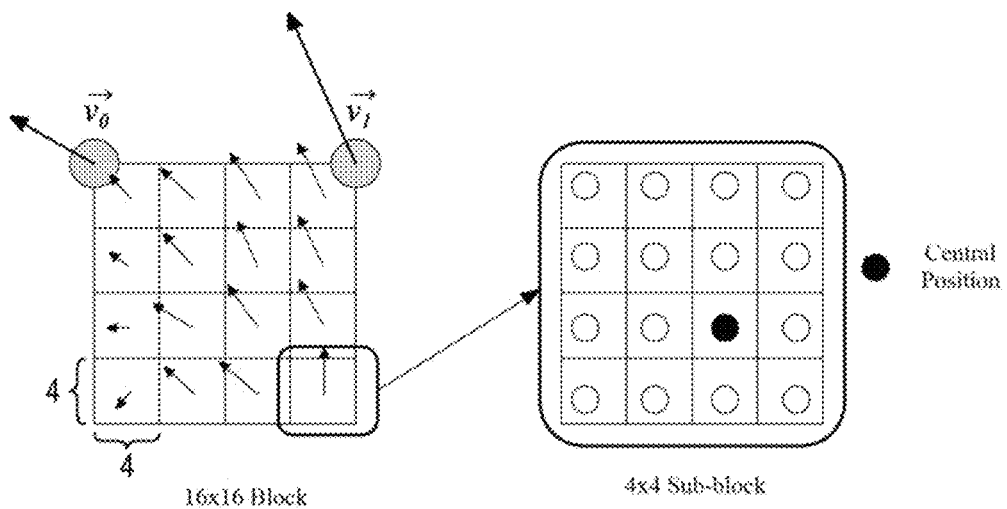
FIG. 5 represents an example in which a motion vector is derived per sub-block.

FIG. 5 represents an example in which a motion vector is derived per sub-block.

In FIG. 5, it was illustrated that a motion vector is derived in a unit of a 4×4 sized sub-block in a 16×16 sized block. In addition, it was illustrated that a motion vector of a sample at a central position in a sub-block is set as a motion vector of a sub-block.

When a motion vector per sub-block is derived, motion compensation may be performed for each sub-block.

When motion vectors of sub-blocks are widely distributed in performing motion compensation in a unit of a sub-block, there may occur a problem that memory consumption increases in hardware implementation.

To resolve the problem, a motion vector of a sub-block may be set not to exceed a threshold value. Concretely, after comparing a motion vector of a sub-block with a threshold value, if it is determined that a motion vector is greater than a threshold value, a motion vector of a sub-block may be changed into a threshold value.

A threshold value may be determined based on a control point motion vector. In an example, a threshold value may be derived based on a result of comparison of a plurality of control point motion vectors. Alternatively, a threshold value may be derived based on at least one of a plurality of control point motion vectors. Concretely, a threshold value may be derived by using the minimum value, the maximum value or an intermediate value among a plurality of control point motion vectors or by using an average value of a plurality of control point motion vectors.

In another example, an integrated sub-block motion compensation method may be applied to resolve the problem. An integrated sub-block motion compensation method means that motion vector of each sub-block is set the same.

When an integrated sub-block motion compensation method is applied, a motion vector of a sub-block at a predefined position may be applied to all sub-blocks. In this case, a predefined position represents at least one of a sub-block at a central position, a top-left sub-block, a top-right sub-block, a bottom-right sub-block or a bottom-left sub-block.

Figure 6:
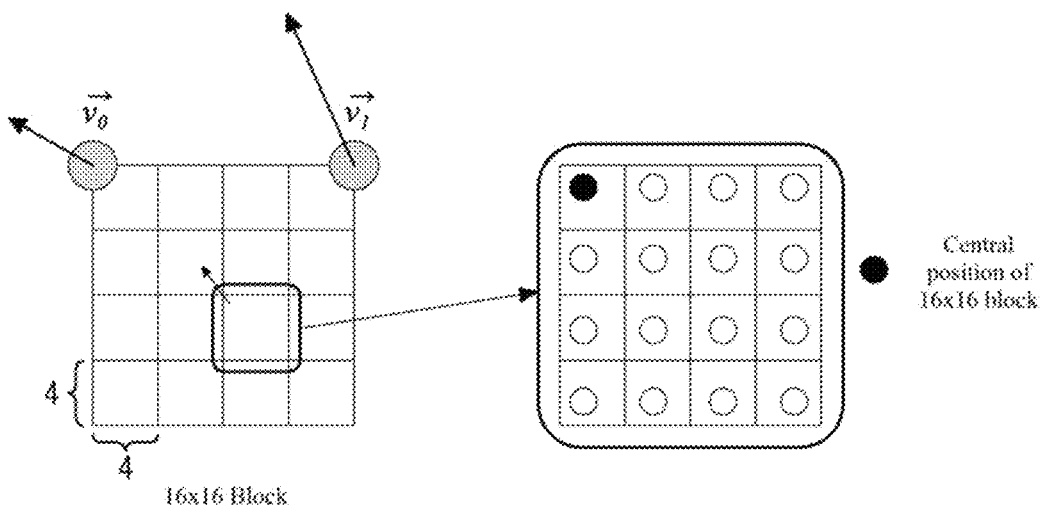
FIG. 6 represents an example of a case in which an integrated sub-block motion compensation method is applied.

FIG. 6 represents an example of a case in which an integrated sub-block motion compensation method is applied.

FIG. 6 represents an example in which a motion vector of a sub-block at a central position is set as a motion vector of all sub-blocks.

In this case, a motion vector of a sample at a representative position in a sub-block at a central position may be set as a motion vector of a sub-block at a central position. A sample at a representative position may be a sample at a central position in a current block (i.e., a top-left sample in a block at a central position).

In other words, when an integrated sub-block motion compensation method is applied, a motion vector of a sample at a central position in a current block may be set as a motion vector of all sub-blocks.

Whether an integrated position sub-block motion compensation method will be applied may be determined based on at least one of a size/a shape of a current block, whether a difference between control point motion vectors is greater than a threshold value or whether a difference between the maximum value and the minimum value among motion vectors of a sub-block is greater than a threshold value.

When a picture is encoded, a size of an image may be changed according to a channel quality. In other words, instead of encoding a picture in an original size, a reduced sized picture that is smaller than the original sized picture may be encoded. When variable size encoding of a picture is allowed, pictures to be encoded may have a different size each other. Accordingly, there may occur a problem in inter prediction since a size between a current picture and a reference picture is different from each other.

To resolve the problem, when a size of a current picture is different from a size of a reference picture, motion compensation may be performed after enlarging or reducing a reference picture. In an example, when a current picture is smaller than a reference picture, a reference picture may be scaled down to a size of a current picture, or when a current picture is greater than a reference picture, a reference picture may be scaled up to a size of a current picture.

Figure 7:
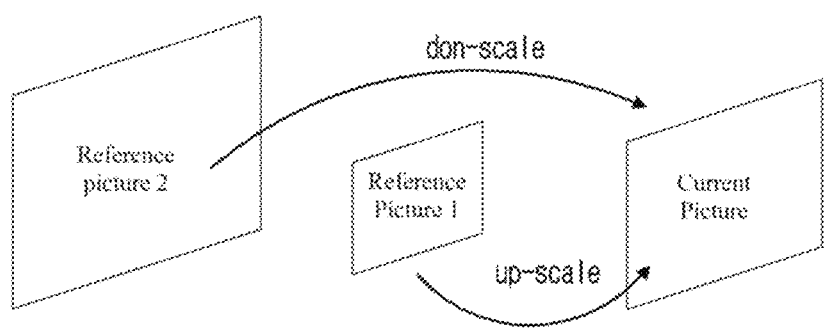
FIG. 7 represents an example in which a size of a reference picture is changed according to a size of a current picture.

FIG. 7 represents an example in which a size of a reference picture is changed according to a size of a current picture.

In another example, a motion vector of a current block may be modified by considering a size ratio between a current picture and a reference picture, instead of changing a size of a reference picture.

Figure 8:
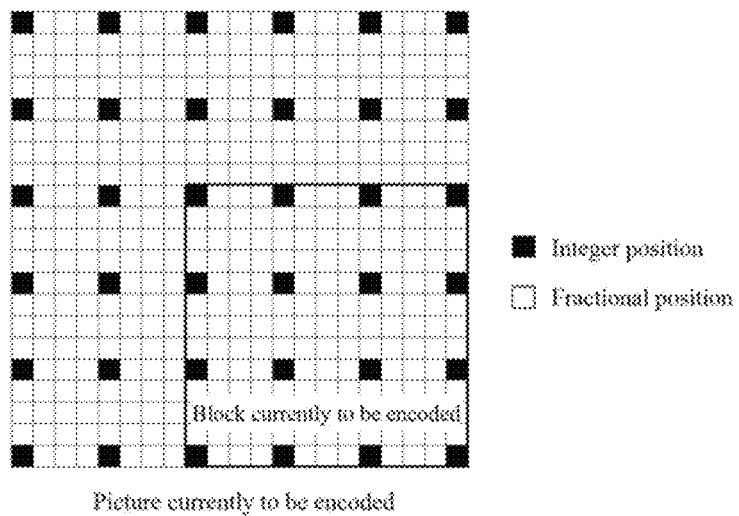
FIG. 8 represents an example in which a motion vector is modified by considering a size of a current picture and a reference picture.
Figure 8:
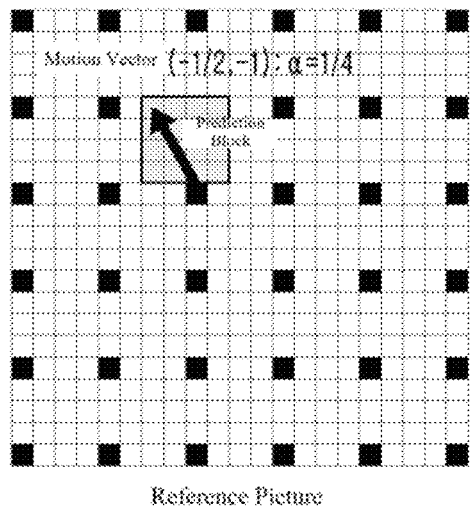

FIG. 8 represents an example in which a motion vector is modified by considering a size of a current picture and a reference picture.

In FIG. 8, $\alpha$ is a variable which represents a ratio between a size of a current picture and a size of a reference picture. After deriving a motion vector of a current block, a modified motion vector may be obtained by scaling up or scaling down a derived motion vector by a variable, $\alpha$.

To increase prediction accuracy, precision of a motion vector may be set more precisely than an integer pixel. It is considered that while each pixel is at an integer position, a motion of an object is not necessarily expressed by an integer position.

A reference image may be interpolated to express a value of a fractional position pixel and a more accurate prediction block may be obtained based on an interpolated image.

FIGS. 9A to 9D represents an example in which a prediction block is generated through reference pixel interpolation.

Figure 9A:
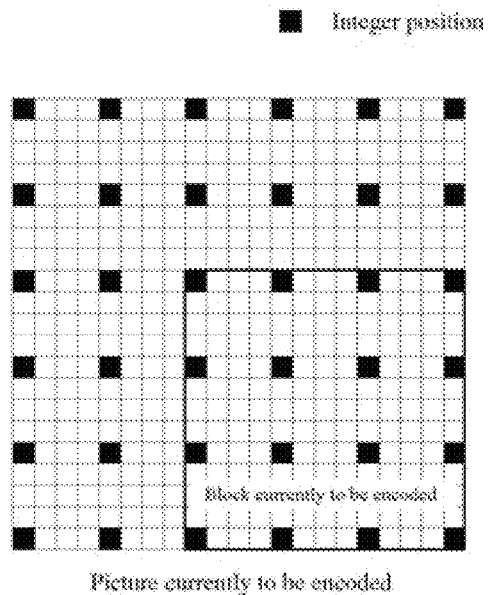
FIGS. 9A to 9D represents an example in which a prediction block is generated through reference pixel interpolation.
Figure 9B:
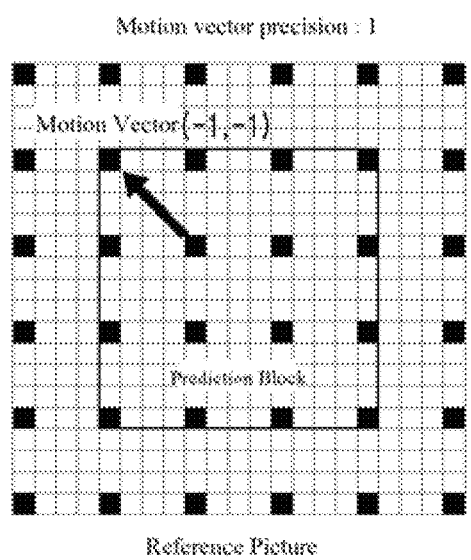
Figure 9C:
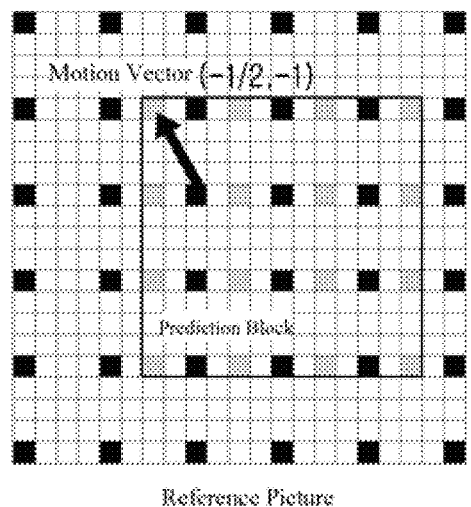
Figure 9D:
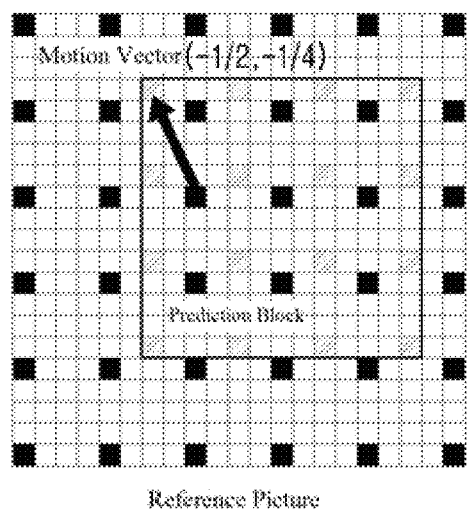

FIG. 9B illustrates a case in which precision of a motion vector is a unit of an integer pixel and FIGS. 9C and 9D illustrate a case in which precision of a motion vector is a unit of a fractional pixel.

As in an example shown in FIGS. 9C and 9D, when precision of a motion vector is a unit of a fractional pixel, fractional position pixels may be set as prediction pixels. In this case, fractional position pixels may be generated by interpolating integer position pixels.

After generating a prediction block, a generated prediction block may be refined by applying an optical flow method. An optical flow method can be applied to a block to which an affine motion model is applied and it also can be applied to which a translation motion model is applied.

A bidirectional optical flow (BDOF) method may be applied to a translation motion model. A value of bdofFlag, a variable representing whether a BDOF method is applied to a current block or not, may be derived based on at least one of whether bidirectional prediction is performed, POC (Picture Order Count) between an L0 reference picture and an L1 reference picture, whether a CIIP mode is applied, whether an L0 weight and an L1 weight are the same or a size of a current block. In an example, bdofFlag, a variable representing whether an optical flow method is applied or not, may be set to be true when at least one or all of a case when bidirectional prediction is performed, when a POC difference between a current picture and an L0 reference picture is the same as a POC difference between a current picture and an L1 reference picture, when a CIIP mode is not applied, when an L0 weight and an L1 weight are the same, when a width and a height of a current block are equal to or greater than 8 and when the number of samples included by a current block is equal to or greater than 128 are satisfied.

A Prediction Refinement Optical Flow (PROF) method may be applied to an affine motion model. A value of prof Flag, a variable representing whether a PROF method is applied to a current block or not, may be determined by considering at least one or all of whether it is allowed to apply a PROF method in a higher header, whether an integrated sub-block motion compensation method is applied, whether CPMV is the same each other or whether size conversion is performed for a reference image. In this case, a higher header may be a sequence, a picture header or a sequence, etc. In an example, ph_prof_disabled_flag, a flag representing whether it is not allowed to apply a PROF method to a current picture, may be signaled through a picture header.

In addition, an integrated sub-block motion compensation method refers to a method that a motion vector of all sub-blocks is set the same.

A variable, profFlag, may be set to be false for at least one of a case when it is not allowed to apply a PROF method in a higher header, a case when an integrated sub-block motion compensation method is not applied, a case when two control point motion vectors are the same each other under a 4-parameter motion model, a case when three control point motion vectors are the same each other under a 6-parameter motion model, or a case when size conversion is performed for a reference image.

A variable, profFlag, may be set to be true only when all the conditions are not satisfied.

When it is determined to apply BDOF, a refine motion vector with the minimum distortion may be calculated in a unit of a 4×4 sub-block for each of an L0 reference block and an L1 reference block. In this case, an L0 reference block means a reference block specified by an L0 motion vector in an L0 reference picture and an L1 reference block means a reference block specified by an L1 motion vector in an L1 reference picture. The following Equation 3 represents an example of deriving a refine motion vector, $(v_x, v_y)$.

$$v_x = \frac{s3}{s1}, v_y = \frac{s4 - v_x \times s5}{s2} \quad \text{[Equation 3]}$$

A refine vector may be derived in a unit of a sample and may be derived in a unit of a sub-block. When a refine vector is derived in a unit of a sample, parameter s1 to s5 shown in Equation 3 may be determined per sample.

On the other hand, when a refine vector is derived in a unit of a sub-block, parameter s1 to s5 shown in Equation 3 may be determined per sub-block. In this case, each of parameter s1 to s5 may be derived by adding up each of s1 to s5 for each of all prediction samples in a sub-block.

In the after-described embodiment, it is assumed that a refine vector is derived per sub-block.

In the above-described Equation 3, s1 to s5 may be derived based on at least one of prediction signal $I^0$ of an L0 reference block in a 4×4 sub-block, prediction signal $I^1$ in an L0 reference block, horizontal directional gradient $I_x^0$ of an L0 prediction signal, vertical directional gradient $I_y^0$ of an L0 prediction signal, horizontal directional gradient $I_x^1$ of an L1 prediction signal and vertical directional gradient $I_y^1$ of an L1 prediction signal.

In an example, parameter s1 to s5 may be derived as in the following Equation 4 based on derived parameters after deriving enumerated parameters for each prediction sample in a 4×4 block.

$$s_1 = \Sigma_{[i,j] \in \Omega} \text{abs}(I_x^1 + I_x^0);$$

$$s_2 = \Sigma_{[i,j] \in \Omega} \text{abs}(I_y^1 + I_y^0);$$

$$s_3 = \Sigma_{[i,j] \in \Omega} (-\text{sign}(I_x^1 + I_x^0) \times (I^0 - I^1))$$

$$s_4 = \Sigma_{[i,j] \in \Omega} (-\text{sign}(I_y^1 + I_y^0) \times (I^0 - I^1))$$

$$s_5 = \Sigma_{[i,j] \in \Omega} \text{sign}(I_y^1 + I_y^0) \times (I_x^0 - I_x^0) \quad \text{[Equation 4]}$$

In reference to Equation 4, in order to derive parameter s1, for each of prediction samples, an absolute value may be taken for a sum of an L1 horizontal directional gradient and an L0 horizontal directional gradient. Subsequently, parameter s1 may be derived by adding up derived values for each of prediction samples in a 4×4 block.

To derive parameter s2, for each of prediction samples, an absolute value may be taken for a sum of an L1 vertical directional gradient and an L0 vertical directional gradient. Subsequently, parameter s2 may be derived by adding up derived values for each of prediction samples in a 4×4 block.

To derive parameter s3, for each of prediction samples, a sign function and a negative sign may be taken for a sum of an L1 horizontal directional gradient and an L0 horizontal directional gradient and a multiplication of a difference between an L0 prediction sample and an L1 prediction sample. Subsequently, parameter s3 may be derived by adding up derived values for each of prediction samples in a 4×4 block. In this case, a sign function is a function which outputs 1 when a value of a variable is a positive number, outputs −1 when a value of a variable is a negative number and outputs 0 when a value of a variable is 0.

To derive parameter s4, for each of prediction samples, a sign function and a negative sign may be taken for a sum of an L1 vertical directional gradient and an L1 vertical directional gradient and a multiplication of a difference between an L0 prediction sample and an L1 prediction sample. Subsequently, parameter s4 may be derived by adding up derived values for each of prediction samples in a 4×4 block.

To derive parameter s5, for each of prediction samples, a value derived by taking a sign function for a sum of an L1 vertical directional gradient and an L0 vertical directional gradient may be multiplied by a sum of an L1 horizontal directional gradient and an L0 horizontal directional gradient. Subsequently, parameter s5 may be derived by adding up derived values for each of prediction samples in a 4×4 block.

Subsequently, a value of an offset may be derived per sample position by using a refine vector. When a refine vector is determined in a unit of a sub-block, an offset for prediction samples belonging to a sub-block may be derived by referring to a refine vector $(v_x, v_y)$ determined in a level of a sub-block. In an example, Equation 5 represents an example in which an offset is derived by using a refine vector.

$$\text{BDOF}_{offset}(i,j) = (v_x \times (I_x^0(i,j) - I_x^1(i,j)))/2 + (v_y \times (I_y^0(i,j) - I_y^1(i,j)))/2$$

After obtaining an offset per sample, a refined prediction sample may be obtained by adding an obtained offset to a prediction sample obtained by the bidirectional prediction.

When it is determined to apply PROF, an offset per prediction sample may be derived after performing motion compensation per sub-block. Concretely, a motion vector difference value per sample may be derived to apply PROF. In this case, a motion vector difference value may represent a difference between a motion vector of a sample at a position (i,j) in a sub-block and a motion vector of a sample at a representative position in a sub-block. In an example, when a sample at a representative position is at a central position, a motion vector difference value of a sample at a position (i,j) may be derived by subtracting a motion vector at a central position from a motion vector of a sample at a position (i,j). A motion vector of each prediction sample may be derived based on Equation 1 or Equation 2.

The following Equation 6 may be derived by applying an optical flow method to $(\Delta v_x(i,j), \Delta v_y(i,j))$, a motion vector difference value of a sample at a position (i,j).

$$\Delta I(i,j)=g_x(i,j)\times\Delta v_x(i,j)+g_y(i,j)\times\Delta v_y(i,j) \quad \text{[Equation 6]}$$

In Equation 6, $\Delta I(i,j)$ represents an offset for a prediction sample at a position (i,j). gx(i,j) represents a horizontal directional gradient for a prediction sample at a position (i,j) and gy(i,j) represents a vertical directional gradient for a prediction sample at a position (i,j).

In the above-described example, a horizontal directional gradient is derived based on a difference between a prediction sample neighboring the right of a position (i,j) and a prediction sample neighboring the left of a position (i,j), and a vertical directional gradient is derived based on a difference between a prediction sample neighboring the bottom of a position (i,j) and a prediction sample neighboring the top of a position (i,j).

When BDOF or PROF is applied, block padding may be performed to derive a horizontal directional gradient and a vertical directional gradient. When block padding is performed, L0 and/or L1 prediction samples may be derived for a sub-block which is expanded by a padding size. In an example, when a size of a sub-block is 4×4 and a padding size is 2, L0 prediction samples and/or L1 prediction samples may be derived for a 6×6 sized block.

Figure 10:
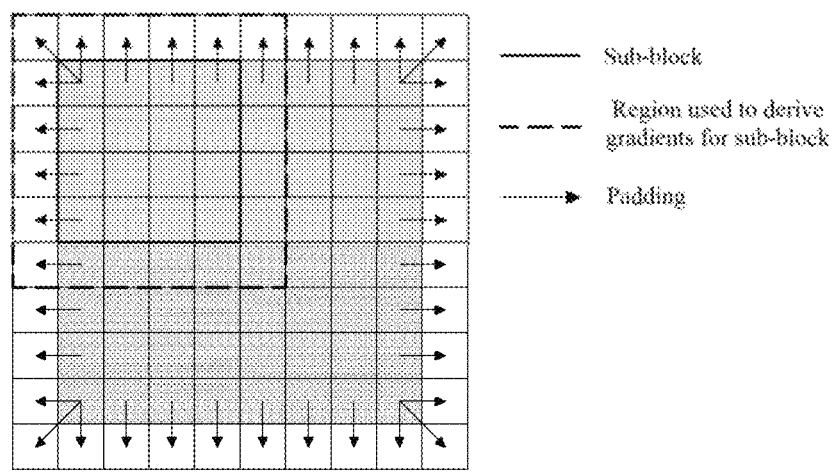
FIG. 10 represents an example in which 2 sized padding is performed for an 8×8 sized block.

FIG. 10 represents an example in which 2 sized padding is performed for an 8×8 sized block.

After determining a padding size in a level of a block, prediction samples per sub-block may be obtained based on the determined padding size. Concretely, when a padding size is greater than 0, prediction samples may be derived for an expanded sub-block.

In an example shown in FIG. 10, it was illustrated that as a padding size is set as 2, L0 prediction samples and/or L1 prediction samples are derived for a 6×6 sized expanded sub-block instead of a 4×4 sized sub-block.

When a horizontal directional gradient and/or a vertical directional gradient for each of prediction samples in a sub-block is derived, samples included in a padding region may be used. In other words, a vertical directional gradient or a horizontal directional gradient of samples positioned on a boundary of a sub-block may be derived based on a sample included in a padding region.

In FIG. 10, it was illustrated that for an expanded sub-block, a width and a height are respectively expanded by 2 compared with a sub-block. A size difference between an expanded sub-block and a sub-block may be defined as a padding size. For example, when a padding size is N, it represents that an expanded sub-block has a width greater than a sub-block by N and a height greater than a sub-block by N.

Whether block padding is performed or not may be determined for a current block. Concretely, brdExtSize, a variable representing a padding size, may be derived per block. The following Equation 7 represents an example in which brdExtSize, an internal variable representing a padding size, is determined.

$$\text{brdExtSize}=(\text{bdofFlag}\|(\text{inter\_affine\_flag}\&\&\ !\text{ph\_prof\_disabled\_flag}))?2:0 \quad \text{[Equation 7]}$$

When a variable, brdExtSize, is 2, it represents that a padding size is 2 and when a variable, brdExtSize, is 0, it represents that padding is not performed.

In the Equation 7, it was illustrated that a value of a variable, brdExtSize, is determined by referring to bdofFlag, a variable determined in a level of a block, inter_affine_flag, a syntax signaled in a level of a block, and ph_prof_disabled_flag, a syntax signaled through a picture header.

But, when a variable, brdExtSize, is determined as in Equation 7, there may occur a problem that ph_prof_disabled_flag, a syntax signaled in a higher level, should be referred to when brdExtSize, a variable for a level of a block, is determined. In addition, as a syntax, inter_affine_flag, is referred to, a problem occurs that block padding is not performed under an affine merge mode.

Accordingly, a variable, brdExtSize, may be derived by referring to a value of profFlag, a variable determined in a level of a block, instead of referring to values of ph_prof_disabled_flag, a syntax signaled in a picture header, and inter_affine_flag, a syntax signaled in a level of a block.

In an example, Equation 8 represents an example in which a value of a variable, brdExtSize, is determined by using only variables determined in a level of a block.

$$\text{brdExtSize}=(\text{bdofFlag}\|\text{profFlag})?2:0 \quad \text{[Equation 8]}$$

As in an example shown in Equation 4, a variable, brdExtSize, may be determined by referring to only bdofFlag, a variable determined in a level of a block, and profFlag, a variable determined in a level of a block, without referring to ph_prof_disabled_flag, a syntax signaled through a higher header. In addition, as a syntax, inter_affine_flag, is not referred to, block padding and PROF may be applied under an affine merge mode.

In the above-described example, it was illustrated that when BDOF or PROF is applied, brdExtSize, a variable representing a padding size, is set to be 2. In another example, when BDOF or PROF is applied, brdExtSize, a variable representing a padding size, is set to be a natural number greater than 2 (e.g., 4).

Alternatively, brdExtSize, a variable representing a padding size, may be adaptively determined based on at least one of a size/a shape of a current block, a size of a control point motion vector, a difference value between control point motion vectors and POC of a reference picture.

Syntaxes used in the above-described embodiments are just named for convenience of description.

When embodiments described based on a decoding process or an encoding process are applied to an encoding process or a decoding process, it is included in a range of the present disclosure. When embodiments described in a predetermined order are changed in an order different from a description, it is also included in a range of the present disclosure.

The above-described embodiment is described based on a series of stages or flow charts, but it does not limit a time series order of the present disclosure and if necessary, it may be performed at the same time or in a different order. In addition, each component (e.g., a unit, a module, etc.) configuring a block diagram in the above-described embodiment may be implemented as a hardware device or a software and a plurality of components may be combined and implemented as one hardware device or software. The above-described embodiment may be recorded in a computer readable recoding medium by being implemented in a shape of a program instruction which may be performed by a variety of computer components. The computer readable recoding medium may include a program instruction, a data file, a data structure, etc. solely or in combination. A hardware device which is specially configured to store and perform magnetic media such as a hard disk, a floppy disk and a magnetic tape, optical recording media such as CD-ROM, DVD, magneto-optical media such as a floptical disk and a program instruction such as ROM, RAM, a flash memory, etc. is included in an example of a computer readable recoding medium. The hardware device may be configured to operate as one or more software modules in order to perform processing according to the present disclosure and vice versa.

What is claimed is:

1. A method of decoding a video, the method comprising:
determining whether an affine motion model is applied to a current block or not; and
performing inter prediction for the current block based on whether the affine motion model is applied or not,
wherein performing the inter prediction for the current block comprises:
determining values of a first variable and a second variable representing whether a prediction block obtained by the inter prediction is refined in units of sub-blocks or not; and
determining a padding size of a sub-block,
wherein the first variable represents whether BDOF (Bi-Directional Optical Flow) is applied to the prediction block or not,
wherein the second variable represents whether PROF (Prediction-Refinement Optical Flow) is applied to the prediction block or not, and
wherein the padding size is determined based on the values of the first variable and the second variable.

2. The method of claim 1, wherein the padding size is determined without referring to a syntax signaled through a picture header.

3. The method of claim 1, wherein the padding size is determined without referring to a syntax representing whether the affine motion model is applied or not.

4. The method of claim 1, wherein the first variable is determined based on whether bidirectional prediction is performed for the current block, POC (Picture Order Count) of an L0 reference picture and an L1 reference picture of the current block, whether a CIIP (Combined Intra-Inter Prediction) mode is applied to the current block or not, an L0 weight and an L1 weight of the current block and a size of the current block.

5. The method of claim 1, wherein the second variable is determined based on at least one of whether integrated sub-block motion compensation method is applied to the current block or not, whether control point motion vectors of the current block are the same each other, or whether size conversion is performed for a reference picture.

6. The method of claim 1, wherein when both the first variable and the second variable are 0, the padding size is set to be 0, and
wherein when at least one the first variable or the second variable is 1, the padding size is set to be 2.

7. The method of claim 6, wherein when the padding size is set to be 2, prediction samples of the current block are generated for an extended sub-block whose a width and a height is greater than a width and a height of the sub-block by 2, respectively.

8. The method of claim 7, wherein the prediction block is refined based on a prediction sample and an offset corresponding to the prediction sample,
wherein the offset is derived based on a horizontal directional gradient or a vertical directional gradient for the prediction sample,
wherein when the prediction sample adjoins a boundary of the sub-block, the horizontal directional gradient or the vertical directional gradient of the prediction sample is obtained based on a prediction sample included in a padding region of the extended sub-region, and
wherein the padding region corresponds to a region excluding the sub-block from the extended sub-block.

9. A method of encoding a video, the method comprising:
determining whether an affine motion model is applied to a current block or not; and
performing inter prediction for the current block based on whether the affine motion model is applied or not,
wherein performing the inter prediction for the current block comprises:
determining values of a first variable and a second variable representing whether a prediction block obtained by the inter prediction is refined in units of a sub-block or not; and
determining a padding size of a sub-block,
wherein the first variable represents whether BDOF (Bi-Directional Optical Flow) is applied to the prediction block,
wherein the second variable represents whether PROF (Prediction-Refinement Optical Flow) is applied to the prediction block or not, and
wherein the padding size is determined based on the values of the first variable and the second variable.

10. The method of claim 9, wherein the padding size is determined without referring to a syntax signaled through a picture header.

11. The method of claim 9, wherein the padding size is determined without referring to a syntax representing whether the affine motion model is applied.

12. The method of claim 9, wherein the first variable is determined by considering whether bidirectional prediction is performed for the current block, POC (Picture Order Count) of an L0 reference picture and an L1 reference picture of the current block, whether a CIIP (Combined Intra-Inter Prediction) mode is applied to the current block or not, an L0 weight and an L1 weight of the current block and a size of the current block.

13. The method of claim 9, wherein the second variable is determined based on at least one of whether integrated sub-block motion compensation method is applied to the current block or not, whether control point motion vectors of the current block are the same each other, or whether size conversion is performed for a reference picture.

14. The method of claim 9, wherein when both the first variable and the second variable are 0, the padding size is set to be 0, and
wherein when at least one of the first variable or the second variable is 1, the padding size is set to be 2.

15. A non-transitory computer readable medium having stored thereon computer executable instructions, which when executed, cause a processor to perform a video decoding method comprising:
- determining whether an affine motion model is applied to a current block or not; and
- performing inter prediction for the current block based on whether the affine motion model is applied or not,
- wherein performing the inter prediction for the current block comprises:
- determining values of a first variable and a second variable representing whether a prediction block obtained by the inter prediction is refined in units of sub-blocks or not; and
- determining a padding size of the sub-block,
- wherein the first variable represents whether BDOF (Bi-Directional Optical Flow) is applied to the prediction block,
- wherein the second variable represents whether PROF (Prediction-Refinement Optical Flow) is applied to the prediction block or not, and
- wherein the padding size is determined based on the values of the first variable and the second variable.

* * * * *